United States Patent
Yokoyama et al.

(10) Patent No.: US 10,962,840 B2
(45) Date of Patent: Mar. 30, 2021

(54) RECURSIVE PHOTOALIGNMENT METHOD

(71) Applicant: Kent State University, Kent, OH (US)

(72) Inventors: Hiroshi Yokoyama, Hudson, OH (US); Mengfei Wang, Kirkland, WA (US)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 16/650,037

(22) PCT Filed: Sep. 25, 2018

(86) PCT No.: PCT/US2018/052529
§ 371 (c)(1),
(2) Date: Mar. 24, 2020

(87) PCT Pub. No.: WO2019/060864
PCT Pub. Date: Mar. 28, 2019

(65) Prior Publication Data
US 2020/0233270 A1  Jul. 23, 2020

Related U.S. Application Data

(60) Provisional application No. 62/562,553, filed on Sep. 25, 2017.

(51) Int. Cl.
*G02F 1/1337* (2006.01)
*G02B 13/24* (2006.01)

(52) U.S. Cl.
CPC ....... *G02F 1/133788* (2013.01); *G02B 13/24* (2013.01)

(58) Field of Classification Search
CPC ...... G02F 1/133788; G02F 1/13; G02B 13/24
See application file for complete search history.

(56) References Cited

U.S. PATENT DOCUMENTS

| 5,909,265 | A | 6/1999 | Kim et al. | |
|---|---|---|---|---|
| 6,169,591 | B1 * | 1/2001 | Kwon | G02F 1/133711 349/124 |
| 2011/0229806 | A1 | 9/2011 | Lin et al. | |
| 2016/0023993 | A1 | 1/2016 | Tabirian et al. | |

* cited by examiner

*Primary Examiner* — Thoi V Duong
(74) *Attorney, Agent, or Firm* — Fay Sharpe LLP

(57) ABSTRACT

A photoalignment method includes photoaligning a first liquid crystal cell and using the photoaligned first liquid crystal cell as a mask in the photoalignment of a second liquid crystal cell. The method may increase spatial dynamic range or decrease pitch.

20 Claims, 14 Drawing Sheets

Original Wave Plate

Photoaligned Target

RECURSIVE PHOTOALIGNMENT METHOD

This application is a National Stage Entry of International Application No. PCT/US2018/052529, filed Sep. 25, 2018, which claims the priority benefit of U.S. Provisional Application Ser. No. 62/562,553, filed Sep. 25, 2017, the contents of which are incorporated by reference herein.

BACKGROUND

The present disclosure relates to a photoalignment method for increasing spatial dynamic range or decreasing pitch.

Photoalignment is a known technology for producing a desired alignment of liquid crystals (LCs) on substrates by irradiating a linearly polarized UV light on a photo-sensitive surface coating. This technique is gaining increasing popularity in the liquid crystal industry to replace the obsolete rubbing technology as a cleaner, non-contact alternative. Beyond uniform alignment, photoalignment allows fabrication of orientational surface patterns with micrometer spatial resolution. Microscopic orientation patterns of liquid crystals find a wide range of novel applications of liquid crystals from transparent LCDs to tunable micro-optics. One of the most serious technical difficulties in upgrading the micro-patterned LC devices from a laboratory prototype to commercial products is the poor productivity of the photoalignment processes due to the fine spatial resolutions required. For one micrometer resolution pattern, a centimeter device requires a patterning process covering four orders of magnitude linear spatial dynamic range.

It has been customary to employ the step-and-repeat scheme as in the semiconductor lithography. But it is technically demanding to ensure the continuity of the pattern across the boundary between neighboring shots, and it is also time consuming. A conventional alternative, in patterned photoalignment, is holographic patterning using a coherent laser light with a sufficient intensity. But the holographic technique becomes impractical when the target pattern becomes complicated beyond a simple grating or a Fresnel lens, and must be customized from one pattern to another.

Using conventional methods of pattern formation, for a given finest pattern size, there is a limit to the maximum size of the area of the substrate that is photoaligned in a single shot light exposure. In maskless photoalignment patterning based on a spatial light modulator such as the digital micromirror device (DMD), the maximum area is typically 1000 times the finest feature of the pattern. Holographic exposure using laser beams allows for processing of much larger areas, but it is only feasible for simple patterns like a linear or 2D gratings and concentric Fresnel lens patterns. Focused beam scanning is an alternative technique, but it takes a long time to process a large area with fine features.

It would be desirable to develop new methods for forming orientational patterns on alignment surfaces for liquid crystal devices.

BRIEF DESCRIPTION

The present disclosure relates to a recursive photoalignment method. The method may be used to increase spatial dynamic range or decrease pitch.

Disclosed, in some embodiments, is a method for photoaligning a liquid crystal cell. The method includes photoaligning a first target liquid crystal cell to produce a first photoaligned liquid crystal cell; and photoaligning a second target liquid crystal cell using the first photoaligned liquid crystal cell as a first phase mask to produce a second photoaligned liquid crystal cell.

The method may further include photoaligning a third target liquid crystal cell using the second photoaligned liquid crystal cell as a second phase mask to produce a third photoaligned liquid crystal cell.

In some embodiments, the method includes photoaligning a fourth target liquid crystal cell using the third photoaligned liquid crystal cell as a third phase mask to produce a fourth photoaligned liquid crystal cell.

The method may further include photoaligning a fifth target liquid crystal cell using the fourth photoaligned liquid crystal cell as a fourth phase mask to produce a fifth photoaligned liquid crystal cell.

In some embodiments, the first photoaligned liquid crystal cell has a first photoalignment pattern; the second photoaligned liquid crystal cell has a second photoalignment pattern; and the second photoalignment pattern has a larger size or a smaller pitch compared to the first photoalignment pattern.

In some embodiments, the first photoaligned liquid crystal cell has a first photoalignment pattern; the second photoaligned liquid crystal cell has a second photoalignment pattern; and the second photoalignment pattern is larger than the first photoalignment pattern.

The first photoalignment pattern and the second photoalignment pattern may have the same pitch.

In some embodiments, the first photoaligned liquid crystal cell has a first photoalignment pattern; the second photoaligned liquid crystal cell has a second photoalignment pattern; and the second photoalignment pattern has a smaller pitch than the first photoalignment pattern.

The first photoalignment pattern and the second photoalignment pattern may be the same size.

In some embodiments, the method further includes providing a protective layer to the first photoaligned liquid crystal cell prior to the photoalignment of the second target liquid crystal cell.

The protective layer may include a reactive mesogen. In some embodiments, the reactive mesogen is 1,4-bis-[4-(3-acryloyloxypropyloxy)benzoyloxy]-2-methylbenzene.

In some embodiments, a beam stop blocks a central beam during at least one of the photoalignment of the first target liquid crystal cell and the photoalignment of the second target liquid crystal cell.

The method may use a plurality of lenses between the first photoaligned liquid crystal cell and the second target liquid crystal cell.

In some embodiments, the first target liquid crystal cell includes an alignment layer comprising a first azo-dye; and wherein the second target liquid crystal cell includes an alignment layer comprising a second azo-dye. The first azo-dye and the second azo-dye may be the same or different.

In some embodiments, the photoalignment of the second target liquid crystal is performed using an ultraviolet light-emitting diode (UV LED).

Disclosed, in other embodiments, is a liquid crystal device including a liquid crystal cell produced by the recursive photoalignment method. The device may include a switchable lens, a diffractive grating, or a beam steering device.

Disclosed, in further embodiments, is a method for photoaligning a liquid crystal cell. The method includes applying an alignment layer to a first liquid crystal cell; aligning the first liquid crystal cell to form a first aligned liquid crystal cell; applying a protective layer to the first aligned liquid crystal cell to form a first phase mask; and photoaligning a second liquid crystal cell with light provided through the first phase mask.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
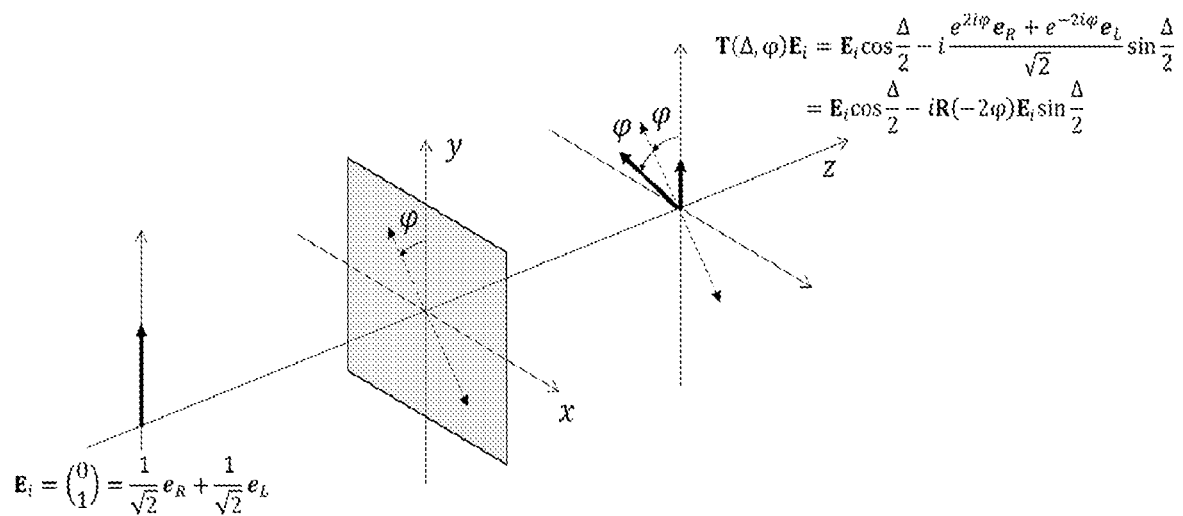
FIG. 1 is a diagram illustrating a wave plate and Pancharatnam-Berry phase.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure.

All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to the microfabrication of orientational patterns on the alignment surfaces for liquid crystal optical devices via photoalignment. The method includes recursively using the photoaligned liquid crystal cell as a phase mask for successive photoalignment processing. In each step, the ratio between the linear scale of the processed area and the finest dimension of the orientational pattern is enhanced (e.g., by a factor of 2). This allows a single shot exposure of a large area with an arbitrary pattern and fine features. It does not require the use of laser light, making it more cost effective and easier to handle.

FIG. 1 illustrates a wave plate and Pancharatnam-Berry (PB) phase with the retardation $\Delta$ and the optic axis rotated by the angle $\varphi$ from the y-axis. A linearly polarized plane wave (polarized along the y-axis) is propagating perpendicular to the wave plate in the z-direction. The PB phase is an additional phase introduced in the optical wave, only associated with the rotation of the wave plate, without any connection with the time and the path length the wave travels as in the ordinary optical phase. For this characteristic, the PB phase is also referred to as the geometric phase.

To describe explicitly the PB phase, linear polarized light can always be decomposed in superposition of left and right handed circularly polarized light components:

$$E_i = \begin{pmatrix} 0 \\ 1 \end{pmatrix} = \frac{1}{\sqrt{2}} e_R + \frac{1}{\sqrt{2}} e_L \qquad (1)$$

where $e_R$ and $e_L$ are the right and the left handed circularly polarized light of unit intensity given by $$e_R = \frac{1}{\sqrt{2}} \begin{pmatrix} 1 \\ -i \end{pmatrix} \quad e_L = \frac{1}{\sqrt{2}} \begin{pmatrix} 1 \\ i \end{pmatrix}. \qquad (2)$$

The action of the wave plate on the light wave is described by a transfer matrix written as $$T(\Delta, \varphi) = R(-\varphi) \begin{pmatrix} e^{-i\Delta/2} & 0 \\ 0 & e^{i\Delta/2} \end{pmatrix} R(\varphi) \qquad (3)$$

with the rotation matrix:

$$R(\varphi) = \begin{pmatrix} \cos\varphi & \sin\varphi \\ -\sin\varphi & \cos\varphi \end{pmatrix}. \qquad (4)$$

The circular polarization is the eigen mode of the rotation matrix and its action is simply to introduce a phase factor, $e^{\pm i\varphi}$, i.e. the PB phase:

$$R(\varphi)e_L = e^{i\varphi} e_L \quad R(\varphi)e_R = e^{-i\varphi} e_R \qquad (5).$$

Using the transfer matrix, the light wave after it passes through the wave plate is given by $$E_o = T(\Delta, \varphi)E_i = E_i \cos\frac{\Delta}{2} - i\frac{e^{2i\varphi}e_R + e^{-2i\varphi}e_L}{\sqrt{2}} \sin\frac{\Delta}{2} \qquad (6)$$

$$= E_i \cos\frac{\Delta}{2} - iR(-2\varphi)E_i \sin\frac{\Delta}{2}. \qquad (7)$$

From Eq.(6), the transmitted wave is comprised of three components, the first being a part of the incident linearly polarized light with the reduced intensity of cos $$\frac{\Delta}{2},$$

and the second and the third being circularly polarized lights with the intensity $$\frac{1}{\sqrt{2}} \sin\frac{\Delta}{2}$$

and the phase shift ±2φ. According to Eq.(7), the circularly polarized lights are identical to a linearly polarized light in the direction tilted by 2φ. This last result indicates that the rotation angle φ of a wave plate generates a linearly polarized light with the rotation angle 2φ.

Photoalignment is a non-contact surface alignment method that is quickly replacing the old rubbing method in industry. Coating the substrates with a photosensitive organic layer with anisotropic absorption, and irradiating the coated substrate with linearly polarized light, the alignment direction for liquid crystal molecules in contact with the substrate is imprinted either perpendicular or parallel to the polarization direction. In FIG. 1, if Δ=π (the half wave condition), the transmitted light is used for photoalignment. The alignment direction of the wave plate φ is transferred to the surface alignment direction 2φ+π/2 or 2φ depending on whether the photoalignment direction is perpendicular or parallel to the polarization direction. For simplicity, it could be assumed that the photoalignment is of parallel type in what follows. However, the same reasoning is valid for the perpendicular type, except for the uniform bias of π/2.

Let φ(x,y) be the distribution of the optic axis on the patterned wave plate to be used as the phase mask for the recursive photoalignment. The patterned wave plate is set in a projection optical system as illustrated in FIG. 2.

The patterned wave plate is illuminated with a collimated linearly polarized light. As indicated by Eq.(6), the light beam splits into three components. The central beam, which is collinear with the incident light is linearly polarized in the same direction as the illumination. One non-limiting aspect of recursive photoalignment is to remove this light component by placing a beam stop at the focal point of the objective lens (Lens #1), so that the half wave condition (Δ=π) is no longer a requirement, although it may still be desirable to make the best use of the energy of the incident light. With the beam stop, it becomes possible to use a wide band light source, which is another advantage of the present disclosure.

Figure 2:
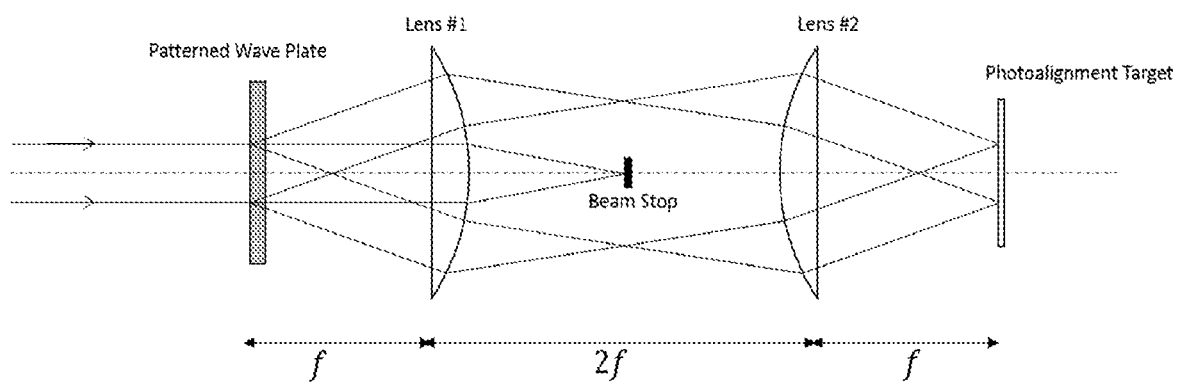
FIG. 2 is a diagram showing a non-limiting example of a projection optical setup for recursive photoalignment.
Figure 3:
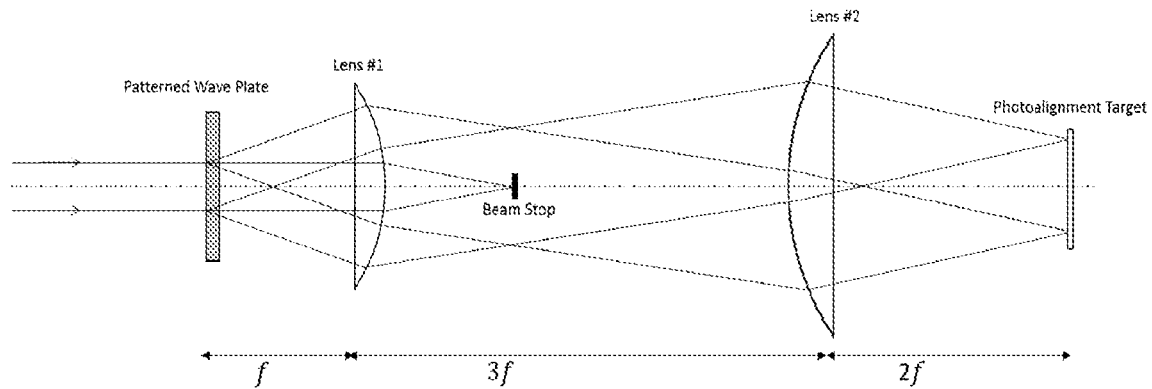
FIG. 3 is a diagram showing another non-limiting example of a projection optical setup for recursive photoalignment.

The remaining two components, depicted as the upper and the lower beams in FIG. 2, are circularly polarized light, subjected to a position dependent phase shift due to the PB effect. These two beams are then focused on the photoalignment target. The distribution of optic axis on the first patterned wave plate is optically transformed to a corresponding distribution of polarization direction of the projected linearly polarized light. FIG. 2 shows the case of unity magnification, employing the lenses with the same focal length f. The optical mapping is generally expressed as $$(x, y) \to \left( \frac{X}{M_x}, \frac{Y}{M_y} \right) \qquad (8)$$

$$\varphi(x, y) \to \varphi_T(X, Y) = 2\varphi\left( \frac{X}{M_x}, \frac{Y}{M_y} \right) \qquad (9)$$

where $M_x$ and $M_y$ are magnification in the x and y directions, which in FIG. 2 are taken to be $M_x = M_y = 1$. Due to the PB effect, the range of angle is twice as large as that on the phase mask, regardless of the magnification. The choice of the magnification is arbitrary. FIG. 3 shows the case of $M_x = M_y = 2$, enlarging the area by a factor of 2.

Figure 4:
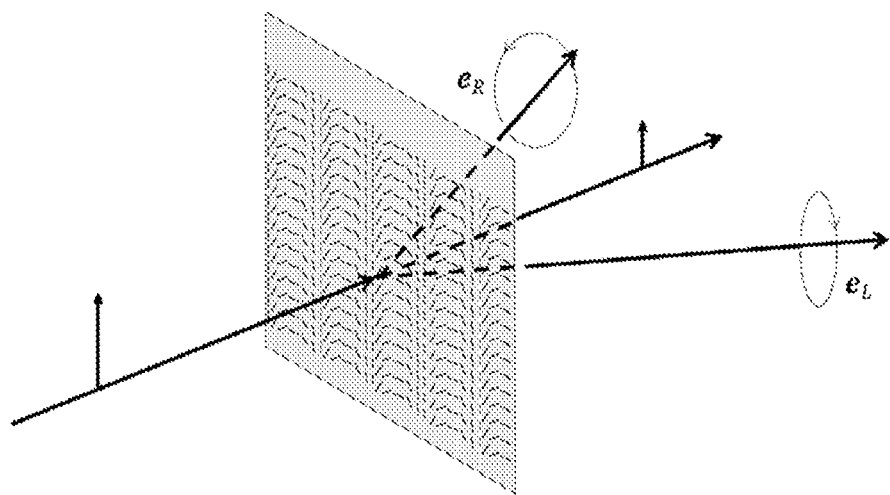
FIG. 4 is a patterned wave plate with a continuously rotated optic axis.

To be more specific, a one dimensional pattern of optic axis is shown in FIG. 4. The angle distribution is written as $$\varphi(x, y) = -\pi \frac{x}{p} \quad (10)$$

where p is the pitch of the pattern over which the optic axis makes a π rotation. As already mentioned, the vertically polarized incident collimated light is split into three collimated beams, the middle of which is also vertically polarized.

Figure 5:
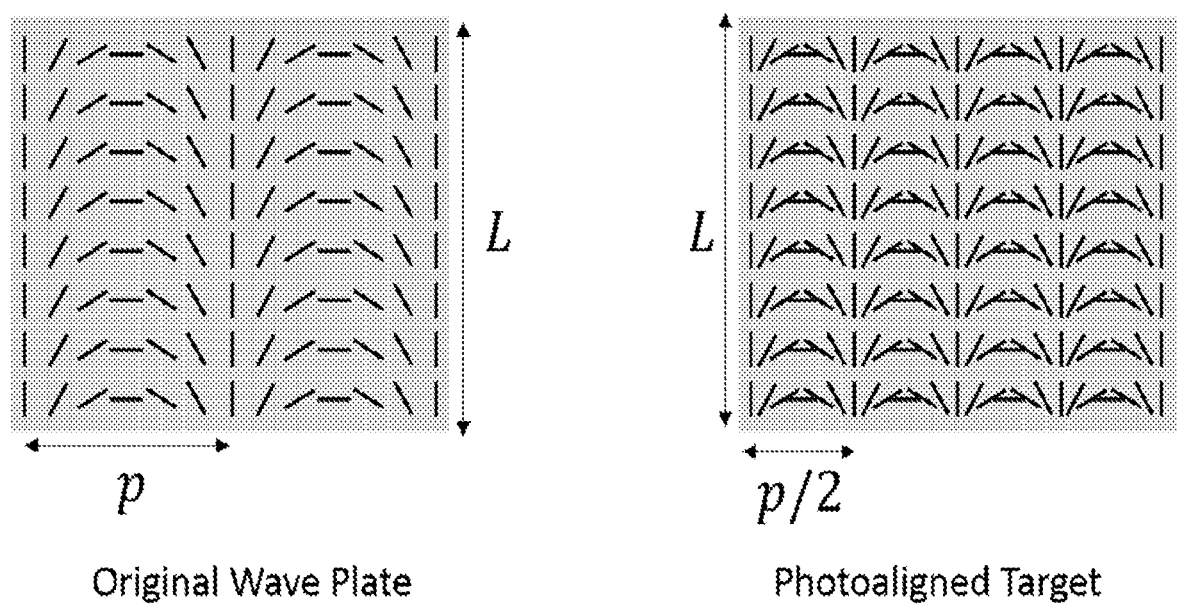
FIG. 5 illustrates a pattern in an original wave plate (left) and a projected photoalignment pattern (right) using a 1:1 projection system.
Figure 6:
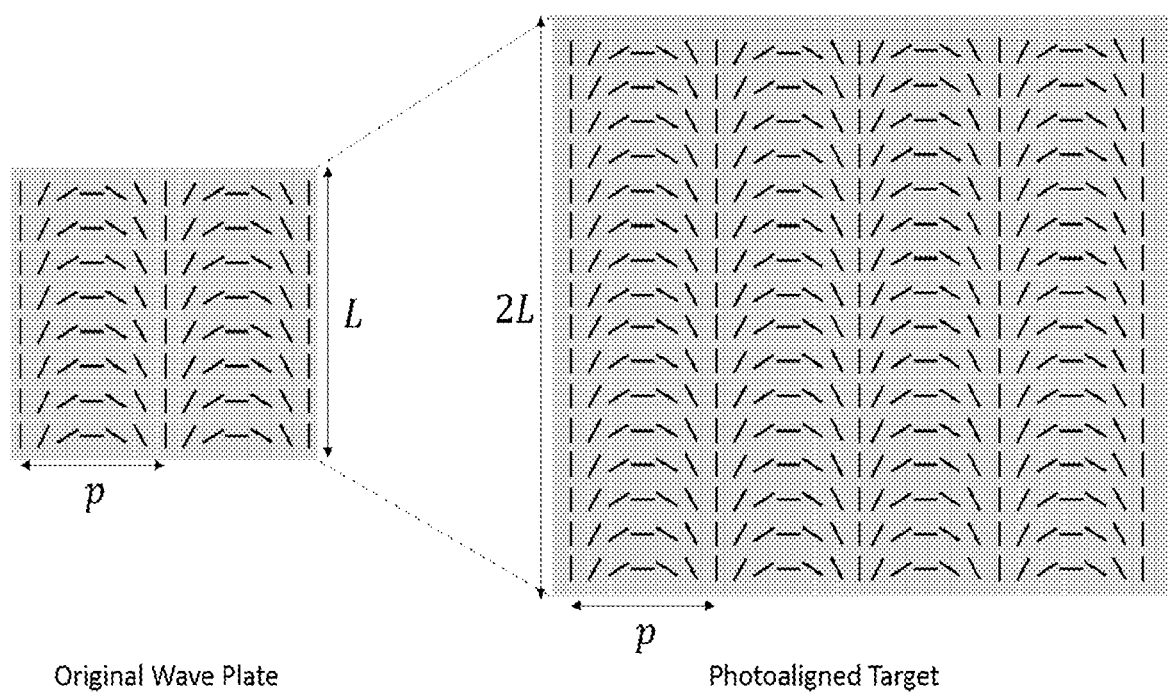
FIG. 6 is illustrates a pattern in an original wave plate (left) and a projected photoalignment pattern (right) using a 1:2 projection system.

Application of the 1:1 and the 1:2 projection systems to this patterned wave plate, may obtain the photoalignment patterns as shown in FIG. 5 and FIG. 6, respectively. In the case of the 1:1 projection, the size of the pattern remains the same, but the pitch is reduced to half, increasing the number of periods to twice as many. On the other hand, the 1:2 projection keeps the pitch, while the size is linearly doubled, or the area becomes four times as large as the original pattern.

The reason why this scheme is named "recursive photoalignment" is that the photoaligned cell from one step can then be used as the patterned wave plate or the phase mask in the subsequent step, allowing further increase of the pattern size or decrease of the pitch.

Figure 7:
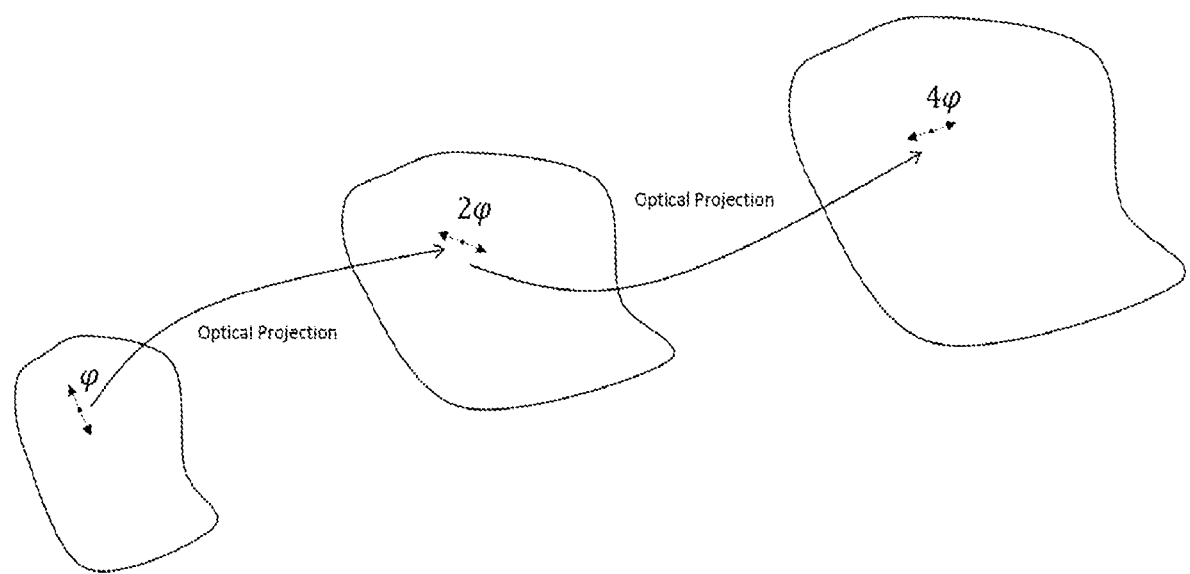
FIG. 7 is a schematic illustration of a recursive photoalignment method.

FIG. 7 schematically illustrates a non-limiting embodiment of recursive photoalignment. Generally put, the projection system maps a point (x,y) on the object plane to a unique point (X, Y) on the image plane. The PB phases, generated by the object wave plate, are carried over to the point on the image point, generating twice as large rotation of the polarization direction from the optic axis on the object. Let φ(x, y) be the distribution of the optic axis on the object plane. The distribution of the photoalignment direction on the target plane $\varphi_T(x, y)$ is then given by $$\varphi_T(X,Y)=2\varphi(x(X,Y),y(X,Y)) \quad (11).$$

Since (x, y)→(X, Y) is a one-to-one mapping, for a given (X, Y), there is one and only one point (x(X, Y), y(X, Y)) on the object plane that corresponds to the target point. For example, in the case of 1:2 optical projection, $$(x(X, Y), y(X, Y)) = \left(\frac{X}{2}, \frac{Y}{2}\right).$$

In general, a projection system with an isotropic magnification M, $$(x(X, Y), y(X, Y)) = \left(\frac{X}{M}, \frac{Y}{M}\right).$$

For the sake of brevity of expressions, there is a focus on the case of isotropic magnification systems, but extension to a general optical projection is also contemplated by the present disclosure.

Let $\varphi_T(x, y)$ be the photoalignment pattern to be prepared on the final target. $\varphi_T(x, y)$ in a power series of homogeneous polynomials:

$$\varphi_T(x, y) = a_{00} + a_{10}x + a_{01}y + \frac{1}{2}a_{20}x^2 + a_{11}xy + \frac{1}{2}a_{02}y^2 + \quad (12)$$

-continued
$$\frac{1}{3!}a_{30}x^3 + \frac{1}{2}a_{21}x^2y + \frac{1}{2}a_{12}xy^2 + \frac{1}{3!}a_{03}y^3 + \dots .$$

It follows from Eq.(11) that the object wave plate that generates the above polarization profile from the magnification M projection must have the distribution of optic axis as $$\varphi(x, y) = \quad (13)$$
$$\frac{1}{2}a_{00} + \frac{M}{2}\{a_{10}x + a_{01}y\} + \frac{M^2}{2}\left\{\frac{1}{2}a_{20}x^2 + a_{11}xy + \frac{1}{2}a_{02}y^2\right\} +$$
$$\frac{M^3}{2}\left\{\frac{1}{3!}a_{30}x^3 + \frac{1}{2}a_{21}x^2y + \frac{1}{2}a_{12}xy^2 + \frac{1}{3!}a_{03}y^3\right\} + \dots .$$

Recursively applying the projection scheme N times, one finds $$\varphi(x, y) = \quad (14)$$
$$\frac{1}{2^N}a_{00} + \frac{M^N}{2^N}\{a_{10}x + a_{01}y\} + \frac{M^{2N}}{2^N}\left\{\frac{1}{2}a_{20}x^2 + a_{11}xy + \frac{1}{2}a_{02}y^2\right\} +$$
$$\frac{M^{3N}}{2^N}\left\{\frac{1}{3!}a_{30}x^3 + \frac{1}{2}a_{21}x^2y + \frac{1}{2}a_{12}xy^2 + \frac{1}{3!}a_{03}y^3\right\} + \dots .$$

This indicates that when M=2, the first order component of the angular distribution remains unchanged through the recursive steps while the range of the pattern is doubled. When M=√2, the second order component remains the same while the size of the pattern is doubled for every two recursions. In the optics terminology, the linear component represents a phase prism and the second order component represents a spherical lens.

In order to achieve the desired photoalignment pattern, the higher order components in the original wave plate may be properly enhanced (M>1)/diminished (M<1) according to Eq.(14).

In some embodiments, the methods of the present disclosure are used for components of VR or AR optical devices or other devices that require large area/fine feature optical components.

The methods of the present disclosure may provide single-shot exposure methods for photoaligning a large area with fine spatial orientational features. The single-shot process may not require accurate positioning, cumbersome and inaccurate step-and repeat procedures for processing a large area, a customized laser for holographic exposure for different orientation patterns, or the use of a coherent light source.

The magnification of the projection is not limited to 2. One can choose an arbitrary magnification for each projection step or even an asymmetric magnification. Although the final size of the patterned area and the finest orientational resolution depends on the magnifications, the spatial dynamic range of the N step process may be enhanced by the factor of $2^N$ regardless.

The process may include the preparation of a micropatterned liquid crystal cell, which may be fabricated by photoalignment or by any other technique, with the typical size of the patterned area of 2 mm×2 mm and the finest orientational resolution of 2 μm in some embodiments. The dynamic range of this cell is therefore 2 mm/2 μm=1000. In the present photoalignment scheme, this cell is used as a phase mask for the next photoalignment process, and the image of this mask is optically projected on the target surface coated with the photoalignment layer using a linearly polarized light source, e.g., at the magnification of 2. Then the size of the projected image is 4 mm×4 mm. The Pancharatnam-Berry phase effect produces twice as large a rotation of the orientation angle of the phase mask so that the orientational resolution remains at 2 μm even on the target surface. Consequently, the spatial dynamic range is now doubled to be 2000. By using the obtained photoaligned cell as the phase mask and repeating the same procedure, the spatial dynamic range is doubled for every photoalignment projection step. For N steps of this cycle, the linear size of the processed area will be enlarged to 2N mm×2N mm, while keeping the finest orientational resolution at 2 μm.

The following examples are provided to illustrate the devices and methods of the present disclosure. The examples are merely illustrative and are not intended to limit the disclosure to the materials, conditions, or process parameters set forth therein.

EXAMPLES

Proof of Concept

Figure 8:
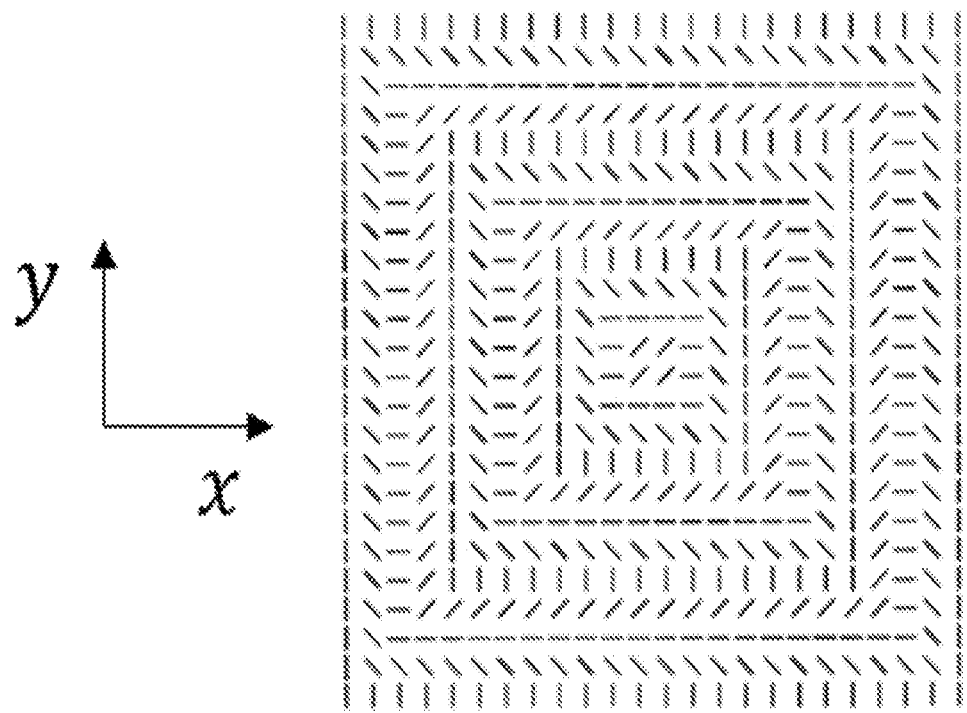
FIG. 8 is a photoalignment pattern used in a proof of concept example.

A photoalignment pattern was used as shown in FIG. 8.

The pattern included four segments, each forming a linear variation of the optic axis. The actual pitch for Tr rotation is 26 μm and the size of the pattern is 2.65 mm×2.65 mm. The detailed conditions of the preparation and the recursive photoalignment is given below.

Figure 9:
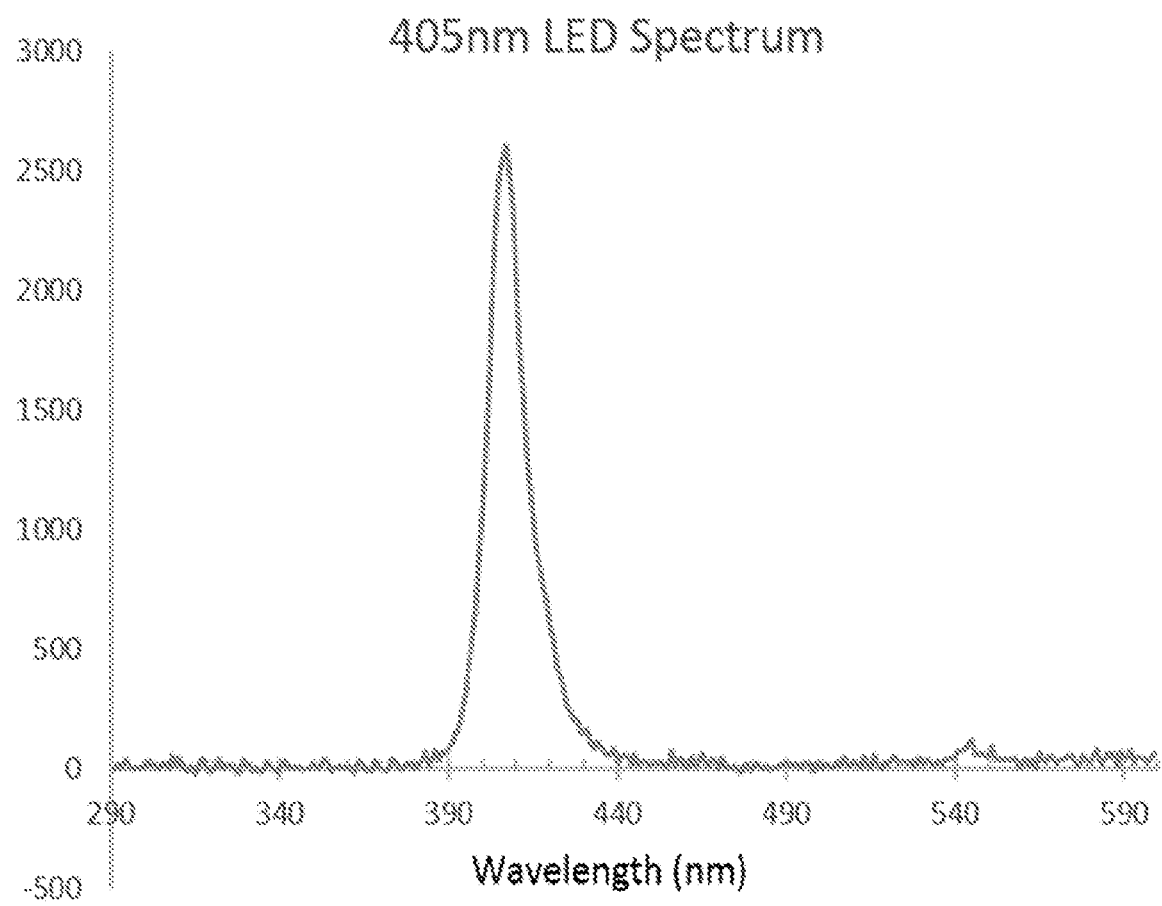
FIG. 9 is a graph showing the spectrum of the UV LED used as a light source for the recursive photoalignment method in the proof of concept example.

Glass Cleaning Process
  a. Ultra-sonication in DI water for 15 min
  b. Rinse by DI water to remove detergent residual
  c. Rinse by IPA (Isopropyl alcohol) to remove water
  d. Store in oven @ 90 C for at least 10 min to make IPA dry
  e. UV-ozone cleaning with deep UV (UVA/UVB) for 5 min Homeotropic aligned substrates—Spincoat 0.2 um filtered diluted PI-1211 (Solvent type 26 from Nissan Chemicals, concentration 1:2) onto cleaned ITO glass
  a. Pre-spin @ 500 rpm for 5 sec
  b. Spin @ 1500 rpm for 30 sec
  c. Prebake @ 80 C for 5 min
  d. Bake @ 180 C for 1 h Photo-aligned substrates Spincoat 0.2 um filtered SD-1 solution onto cleaned ITO glass
  a. Solution: 1.8% wt. in DMF (Dimethylformamide)
  b. Ultra-sonication @ 60 C for 20 min
  c. Pre-spin @ 500 rpm for 7 sec
  d. Spin @ 1500 rpm for 30 sec
  e. Bake @ 60 C for 1 min Photo-Patterning
  a. Original Phase mask (through DMD 2.0)
    i. 465 nm blue light, 0.247 mW/mm$^2$ after 2.5× objective lens (Zeiss)
    ii. 40 sec/angle, 3 times iteration
    iii. 2.65 mm×2.65 mm of square pattern
    iv. pitch size 26.5 um
  b. Enlargement (printed area)
    i. 405 nm LED, 254 mW/mm$^2$ after the fiber
    ii. 100 mm (collimation)/100 mm/200 mm focal length setup
    iii. 1$^{st}$ enlargement: 5.3 mm×5.3 mm, 1 h exposure
    iv. 2$^{nd}$ enlargement: 10.6 mm×10.6 mm, 1 h exposure
    v. 3$^{rd}$ enlargement: 2.1 cm×2.1 cm, 2 h exposure
    vi. 4$^{th}$ enlargement: 4.2 cm×4.2 cm, 2 h exposure, but corners limited by the size of the 200 mm lens
  c. Shrinkage (Pitch Size)
    i. 100 mm (collimation)/100 mm/100 mm focal length setup
    ii. 1$^{st}$ scale down: 13.2 um, 1 h exposure
    iii. 2$^{nd}$ scale down: 6.6 um, 1 h exposure
    iv. 3$^{rd}$ scale down: 3.3 um, Protective layer (Reactive Mesogen RM257 (1,4-bis-[4-(3-Acryloyloxypropyloxy)benzoyloxy]-2-methylbenzene) from Wilshire Technologies)
  a. Solution: 2% wt. in Toluene, with 0.1% wt. of photo-initiator (2-Methyl-4'-(methylthio)-2-morpholinopropiophenone)
  b. Pre-spin @ 500 rpm for 7 sec
  c. Spin @ 3000 rpm for 30 sec
  d. Cure with 306 nm UV lamp (840 uW/cm$^2$) for 30 sec in N$_2$ atmosphere Cell Assembly
  a. 15 um spacers
  b. LC: ZLI-2293 (Merck) fill @ RT
  c. Half-wave voltage 4.05V for all cells The first photoalignment pattern was fabricated by the maskless pattern generator, using a photoalignment agent referred to as SD1. The photoaligned surface was then coated with a reactive mesogen (RM) to make it resistant to for prolonged UV light irradiation in the subsequent projection process. For the recursive photoalignment, a UV LED at 405 nm was used. FIG. 9 shows the spectrum of the LED light indicating the band width of ca. 20 nm.

Enlarging Recursive Photoalignment using 1:2 Projection System

Using the patterned substrate as a liquid crystal cell, a patterned wave plate was obtained for use as the first phase mask. The 1:2 projection system, shown in FIG. 3, was be used.

Figure 10:
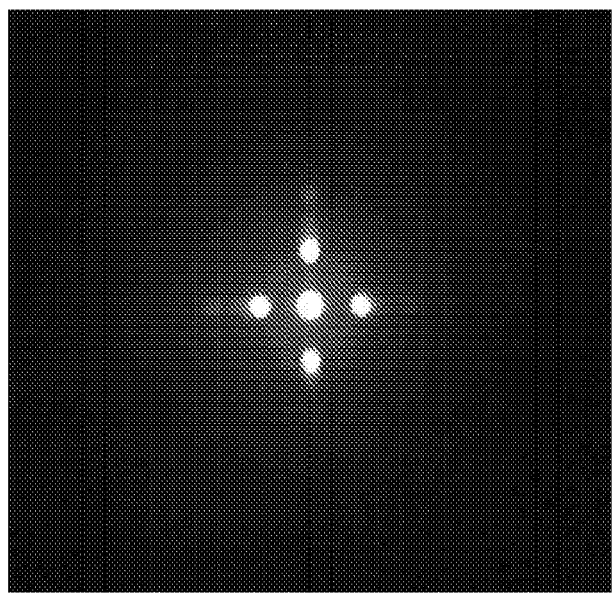
FIG. 10 is a photograph showing diffraction from the patterned wave plate in the proof of concept example.

FIG. 10 shows the diffraction spots from the patterned wave plate, observed at the focal plane of the objective lens (lens #1 in FIG. 3). In addition to the center spot, which is the linearly polarized component collinear with the incident linearly polarized UV LED light, there are four spots corresponding to the diffraction from the four segments of the pattern. The center spot was blocked by a beam stop and the rest of the light beams were projected on the target substrate coated with SD1.

Figure 11:
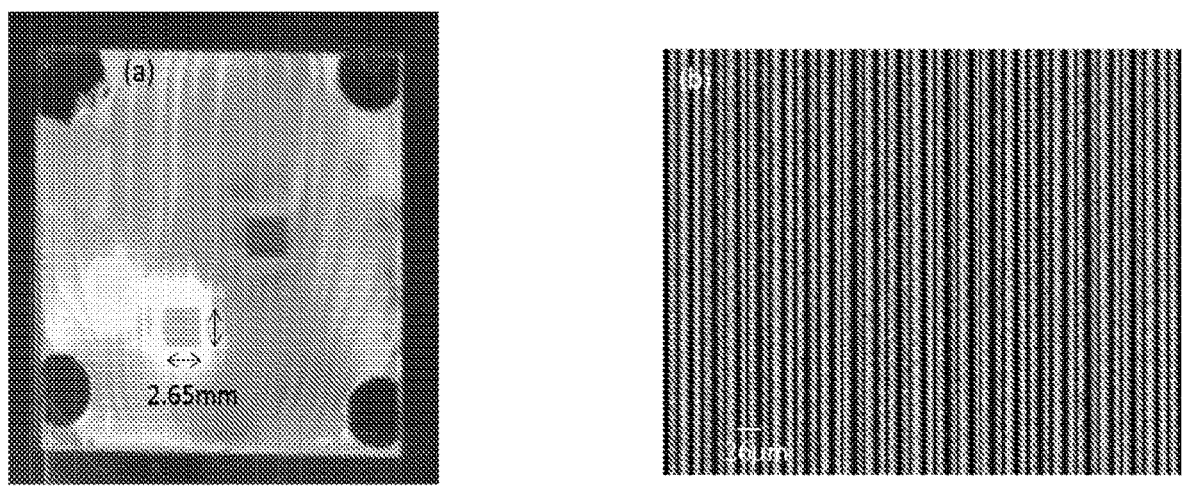
FIG. 11 includes (a) a picture of an original patterned wave plate liquid crystal cell; and (b) a polarizing micrograph of the linear pattern.
Figure 12:
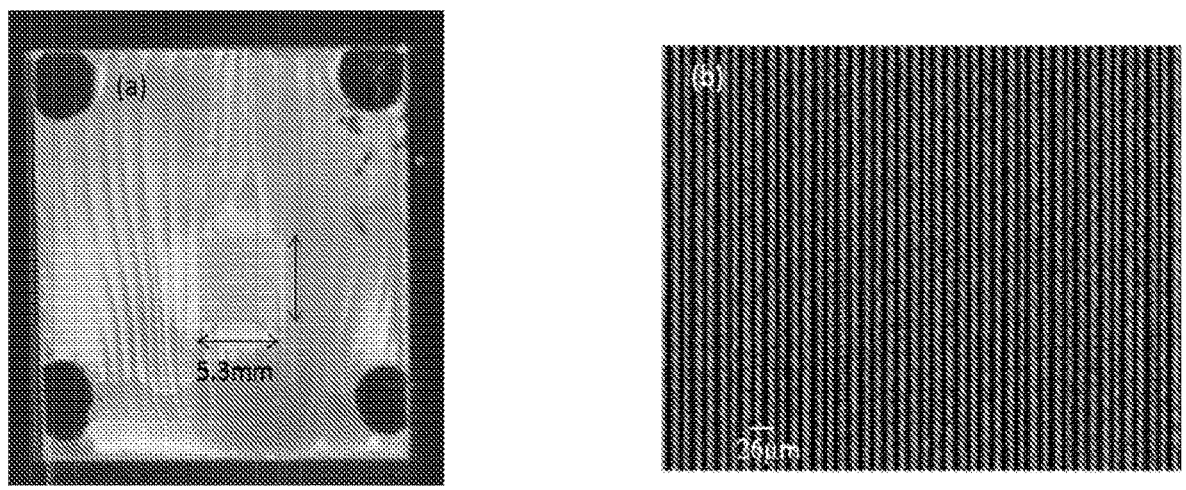
FIG. 12 includes (a) a picture of an entire first projected pattern formed using 1:2 projection optics; and (b) a micrograph under a polarizing microscope.
Figure 13:
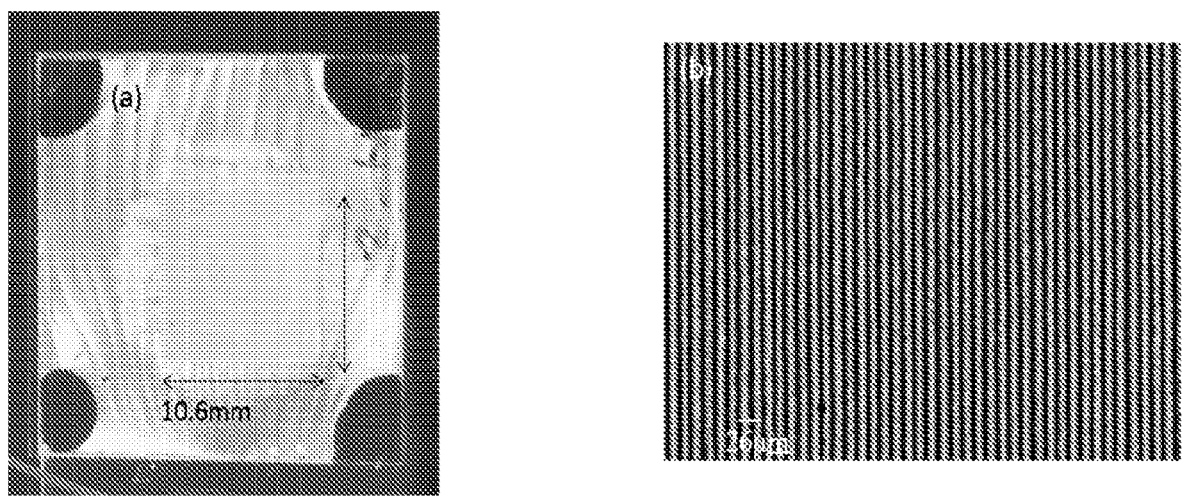
FIG. 13 includes (a) a picture of an entire second projected pattern formed using 1:2 projection optics; and (b) a micrograph under a polarizing microscope.
Figure 14:
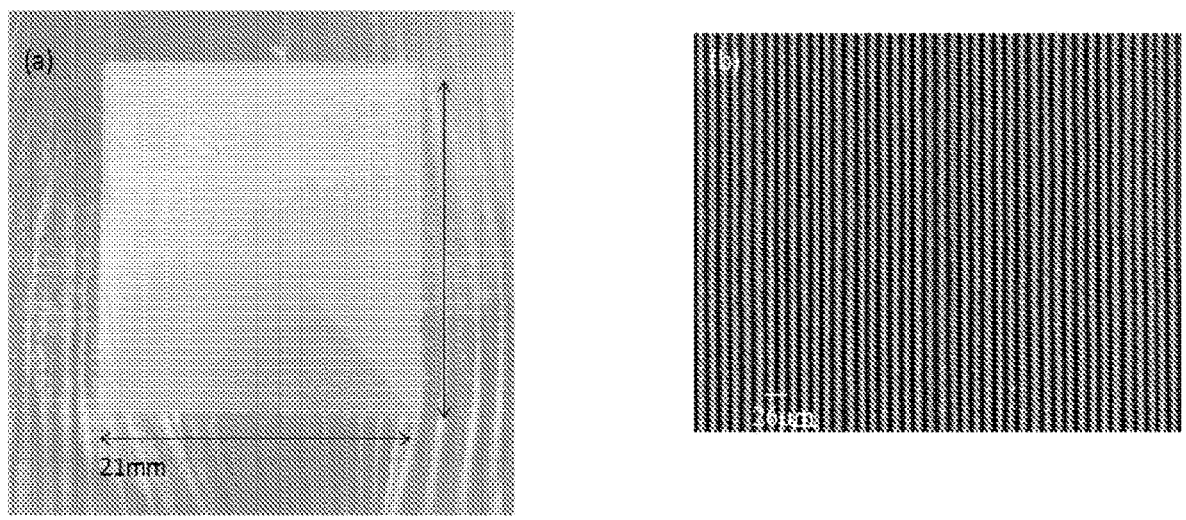
FIG. 14 includes (a) a picture of an entire third projected pattern formed using 1:2 projection optics; and (b) a micrograph under a polarizing microscope.

FIG. 11 shows the first wave plate. FIG. 12 shows the result of the first recursive projection of the original patterned wave plate. It is clearly demonstrated that the pattern size is doubled from 2.65 mm to 5.3 mm while keeping the pitch of the periodic pattern unchanged. The recursive process was continued until the pattern size exceeds the beam size of the UV light. FIG. 13 and FIG. 14 are, respectively, the second and the third projection results using the patterned cell as the phase mask. The size of the patterned area is doubled with the identical pattern pitch.

Recursive Photoalignment using 1:1 Projection System

Figure 15:
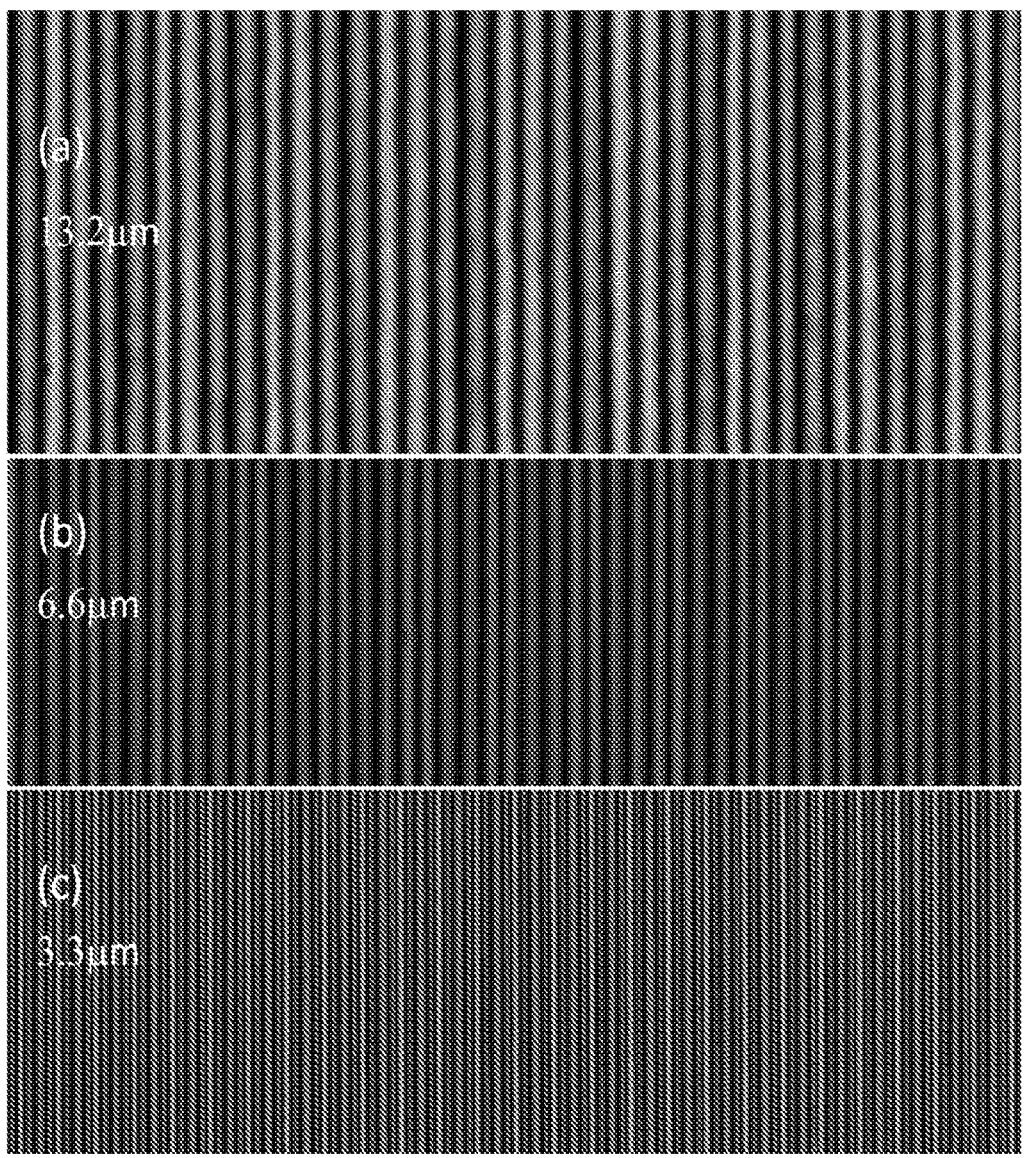
FIG. 15 includes micrographs of patterns achieved using 1:1 projection optics: (a) first projection; (b) second projection; (c) third projection.

Recursive photoalignment was also carried out using 1:1 projection optics. In this case, the size of the pattern remains the same, but the pitch is reduced to half at every step. As shown in FIG. 15, the pitch of the pattern shrinks to half of the phase mask. In this example, the first projection yielded the pitch 13 μm, the second did 6.6 μm pitch, and the third did 3 μm pitch.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A recursive photoalignment method comprising:
   photoaligning a first target liquid crystal cell to produce a first photoaligned liquid crystal cell; and
   photoaligning a second target liquid crystal cell using the first photoaligned liquid crystal cell as a first phase mask to produce a second photoaligned liquid crystal cell.

2. The recursive photoalignment method of claim 1, further comprising:
   photoaligning a third target liquid crystal cell using the second photoaligned liquid crystal cell as a second phase mask to produce a third photoaligned liquid crystal cell.

3. The recursive photoalignment method of claim 2, further comprising:
   photoaligning a fourth target liquid crystal cell using the third photoaligned liquid crystal cell as a third phase mask to produce a fourth photoaligned liquid crystal cell.

4. The recursive photoalignment method of claim 3, further comprising:
   photoaligning a fifth target liquid crystal cell using the fourth photoaligned liquid crystal cell as a fourth phase mask to produce a fifth photoaligned liquid crystal cell.

5. The recursive photoalignment method of claim 1, wherein the first photoaligned liquid crystal cell has a first photoalignment pattern; wherein the second photoaligned liquid crystal cell has a second photoalignment pattern; and wherein the second photoalignment pattern has a larger size or a smaller pitch compared to the first photoalignment pattern.

6. The recursive photoalignment method of claim 1, wherein the first photoaligned liquid crystal cell has a first photoalignment pattern; wherein the second photoaligned liquid crystal cell has a second photoalignment pattern; and wherein the second photoalignment pattern is larger than the first photoalignment pattern.

7. The recursive photoalignment method of claim 6, wherein the first photoalignment pattern and the second photoalignment pattern have the same pitch.

8. The recursive photoalignment method of claim 1, wherein the first photoaligned liquid crystal cell has a first photoalignment pattern; wherein the second photoaligned liquid crystal cell has a second photoalignment pattern; and wherein the second photoalignment pattern has a smaller pitch than the first photoalignment pattern.

9. The recursive photoalignment method of claim 8, wherein the first photoalignment pattern and the second photoalignment pattern are the same size.

10. The recursive photoalignment method of claim 1, further comprising:
    providing a protective layer to the first photoaligned liquid crystal cell prior to the photoalignment of the second target liquid crystal cell.

11. The recursive photoalignment method of claim 10, wherein the protective layer comprises a reactive mesogen.

12. The recursive photoalignment method of claim 11, wherein the reactive mesogen is 1,4-bis-[4-(3-acryloyloxypropyloxy)benzoyloxy]-2-methylbenzene.

13. The recursive photoalignment method of claim 1, wherein a beam stop blocks a central beam during at least one of the photoalignment of the first target liquid crystal cell and the photoalignment of the second target liquid crystal cell.

14. The recursive photoalignment method of claim 1, wherein the method uses a plurality of lenses between the first photoaligned liquid crystal cell and the second target liquid crystal cell.

15. The recursive photoalignment method of claim 1, wherein the first target liquid crystal cell comprises an alignment layer comprising a first azo-dye; and wherein the second target liquid crystal cell comprises an alignment layer comprising a second azo-dye.

16. The recursive photoalignment method of claim 15, wherein the first azo-dye and the second azo-dye are the same.

17. The recursive photoalignment method of claim 1, wherein the photoalignment of the second target liquid crystal is performed using an ultraviolet light-emitting diode (UV LED).

18. A liquid crystal device comprising a liquid crystal cell produced by the method of claim 1.

19. The liquid crystal device of claim 18, wherein the device comprises a switchable lens, a diffractive grating, or a beam steering device.

20. A recursive photoalignment method comprising:
    applying an alignment layer to a first liquid crystal cell;
    aligning the first liquid crystal cell to form a first aligned liquid crystal cell;
    applying a protective layer to the first aligned liquid crystal cell to form a first phase mask; and
    photoaligning a second liquid crystal cell with light provided through the first phase mask.

* * * * *